United States Patent [19]
Paudras

[11] 3,949,872
[45] Apr. 13, 1976

[54] INDIVIDUAL CASE FOR PHONOGRAPH RECORDS

[76] Inventor: Francis Paudras, 68, rue de Clichy, 75009 Paris, France

[22] Filed: July 11, 1974

[21] Appl. No.: 487,658

[30] Foreign Application Priority Data
July 19, 1973  France .............................. 73.26529

[52] U.S. Cl. ................................ 206/310; 220/334
[51] Int. Cl.² ........................................ B65D 85/30
[58] Field of Search ........... 206/309, 310, 311, 312, 206/313; 220/306, 334, 352, 4 B

[56] References Cited
UNITED STATES PATENTS

| | | | |
|---|---|---|---|
| 3,107,783 | 10/1963 | Corey et al. .......................... | 206/310 |
| 3,109,539 | 11/1963 | Turoff ................................. | 206/310 |
| 3,530,981 | 9/1970 | Wienecke, Jr. ...................... | 206/310 |
| 3,825,112 | 7/1974 | Schumaker et al. ................. | 206/310 |

*Primary Examiner*—Steven E. Lipman
*Attorney, Agent, or Firm*—Browdy and Neimark

[57] ABSTRACT

A case for enclosing phonograph records and the like is disclosed which provides for rigid support of the record and protection from scratching, dust and moisture without allowing the surface of the case to contact the record's grooved surfaces thereby damaging those surfaces. The molded case is formed of a lid and a body hingedly joined at one edge of each. The lid and body are molded to form flush joints and a centering pin together with annular bearing zones. Together these insure the record stays in position within the case, is protected from crushing force external to the case and is further protected from moisture and scratching.

12 Claims, 3 Drawing Figures

INDIVIDUAL CASE FOR PHONOGRAPH RECORDS

BACKGROUND OF THE INVENTION

Considerable progress has been made in improving the fidelity of phonograph records. High-fidelity systems have attained a remarkable degree of perfection. Searching studies have been made of listening areas themselves.

It is curious to note that no parallel effort has been made to improve the holding and storage of records, while the slightest scratch on their grooves or the tiniest dust deposit causes spurious noise which decreases with the fidelity of the reproduction. From their earliest days, records have been slipped into jackets. The inevitable friction between the jacket and the record causes damage to the grooves and electrostatic charges which attract dust. Moreover, to remove a record from its jacket one must grasp its edge with at least two fingers in the area of the outer grooves.

Finally, records are often stored vertically, and their entire weight bears on the point where the record rests on its support. This can cause general warping of the record, causing listening imperfections which become more striking as reproduction improves.

SUMMARY OF THE INVENTION

The object of the present invention is an individual case for phonograph records, eliminating all the drawbacks inherent in the jackets presently used and able to shelter the record from all harmful factors to which it hitherto has been exposed: mechanical friction, eletrostatic charges, humidity and dust. The case made according to the present invention lends itself both to flat stacking and vertical storage of records. It enables them to be easily identified and selected, and moreover is an attractive and effective presentation display. Finally, it does not wear out, is easy to manufacture and is low in cost.

According to the essential characteristic of the invention, this case, made in thin molded synthetic material and with a square body and lid joined at one edge, is distinguished by the fact that its body and lid form the cooperating elements of two flush joints, keeping the case sealed and rigid and enabling the record contained therein to be centered.

Moreover, according to the invention, the body of the case forms the male elements of these two joints; the female elements are formed by the lid.

It is advantageous for the first joint, formed on the four rectilinear edges of the case, to stiffen the edges of its body and its lid, while the second joint, which is circular, determines the position of the record by its male part such as to pre-center it in the body of the case.

Another important characteristic of the invention consists of the fact that it includes a centering pin for the record, extending as far as the lid to keep it in place when the case is closed, and resisting its being crushed, in cooperation with the two flush joints.

BRIEF DESCRIPTION OF THE DRAWINGS

Other features of the invention will be apparent from the description hereinbelow of a preferred embodiment of the invention schematically represented without consideration of scale or proportions in the attached drawings, wherein.

DETAILED DESCRIPTION

Figure 1:
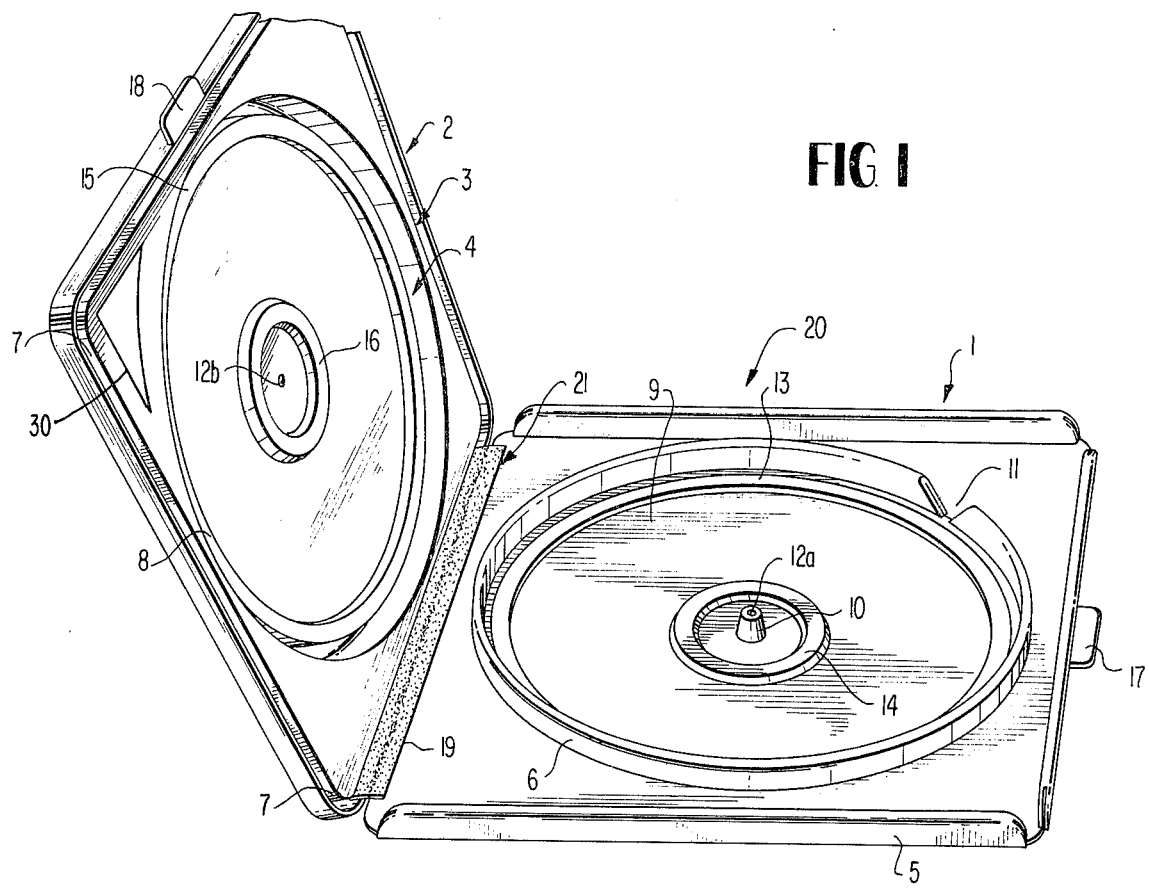
FIG. 1 is a perspective view of the open case of the present invention.

As shown in FIG. 1, the body of the case, generally indicated at 20, whose lid generally indicated at 2, is hingedly jointed to one edge thereof generally indicated at 21. This case is obtained by any appropriate process for molding plastic, for example, the hot-stamping process for polyvinyl chloride. One can see that its body 1 and lid 2 form the cooperating elements of two flush joints, respectively generally designated at 3 and 4; the male elements 5 and 6 of these two joints being formed in the body 1 of the case 20, the corresponding female elements 7 and 8 being formed on the lid 2. FIG. 1 clearly shows that the first joint 3 comprising the four rectilinear edges of the case, constitutes a ridge which stiffens the edges of the case, while second circular joint 4 constitutes a second stiffening ridge for the case 20. The male part 6 of the second circular joint 4 determines the space 9 for the record D placed therein.

Figure 2:
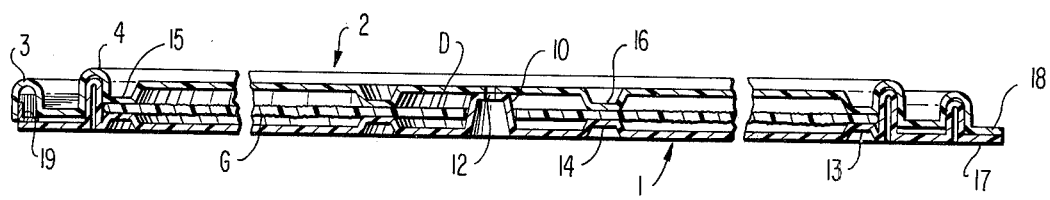
FIG. 2 is a front vertical section of the case of FIG. 1 when shut and containing a record.
Figure 3:
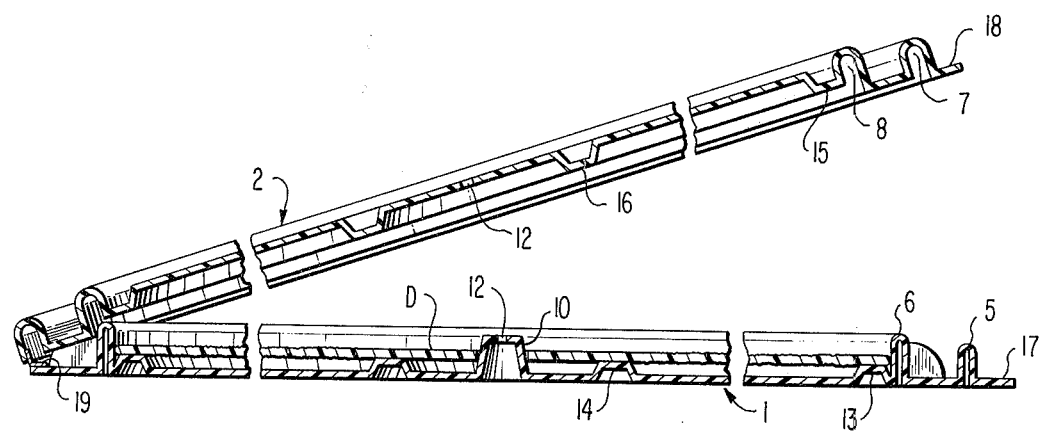
FIG. 3 is a front vertical section of the case of FIG. 1 showing the case open.

Moreover, according to the present invention, a centering pin 10 is formed in the body 1 of the case 20. FIG. 2 clearly shows that this pin 10 extends upward after engaging the center hole of record D to the wall of lid 2 which it supports at its center, thus resisting crushing of the case when several such cases are stacked. This reinforcement to prevent crushing of the case is also effected by the two flush joints 3 and 4.

It may be seen that pin 10 is conical, and that it bears against the edge of the center spindle hole of record D placed in the case to exercise a slight holding pressure. The male part 6 of circular joint 4 constitutes a means of pre-centering the record, facilitating its placement in the case, and engagement of pin 10 in the hole thereof. Thus, it is in fact the pin which immobilizes the record from lateral movement within space 9.

To remove the record D from the case 20, a notch 11 is provided in the male part 6 of joint 4, preferably opposite one of the corners of the case 20.

To prevent air pressure from hindering opening of the case, whose surface is very large in relation to its thickness, at least one venting hole can be pierced at any point thereof. This venting hole is preferably placed at the top of pin 10 itself or the corresponding part of lid 2, as indicated at 12a and 12b.

It is known that it is often difficult to open plastic airtight boxes with a peripheral flush joint, for example, rectangular utility boxes. To remedy this disadvantage, and still according to the invention, the male part 5 of the first joint 3 is made discontinuous at the corners of the case 20, which facilitates the easy mating of the elements of this male part 5 with the corresponding female parts 7 of the lid 2 and the opening of lid 2.

However, it is important for the closed case to be quite rigid and, for this purpose, the female part 7 of the first joint 3 is preferably made continuous around the entire periphery of the case.

It is essential that the grooved area G of the record be protected from all contact and all friction. According to the present invention, this result is obtained by arranging, both in the body 1 of the case 20 and the lid 2, annular bearing zones 13 and 14 in the body 1 of the case 20, and 15 and 16 in the lid 2, these zones being the only ones in which the record contacts the case. These zones are spaced to engage the sides of record D in the portion of the surface at the beginning of the record containing no reproducible sounds, i.e., in the ungrooved periphery, and at the center of the record in the region corresponding to the printed label. This ensures that the grooved area G containing the recorded sounds to be reproduced from the record remains untouched. It will be observed that the circular ridges in the case thus created constitute additional stiffening elements for the case as a whole.

Opening will be facilitated by tabs 17 and 18 arranged respectively in the molding on the case 20 body 1 and on the lid 2, said tabs coinciding when the case is closed. They can also be used as thumb-tabs or filing markers.

The case in question can be made of transparent, opaque or colored material. In the first case the whole of the record it contains will be visible when the case is closed, and its circular central label will then be clearly legible.

However, it is also possible, for advertising or other purposes, to provide a circular label with a diameter equal to that of the record lodged in the annular recess made on lid 2 between supports 15 and 16 which will efficaciously center the label.

If, on the other hand, the case is made of opaque plastic, this annular zone of the lid 2 and possibly matching angular zone of the case's body 1 can both be embossed, engraved or printed with any inscriptions and markings. For this purpose it will be easy to provide an interchangeable central part in the mold in which it is cast, corresponding to the zone in question.

Experience has shown that a plastic satisfactory for forming the case itself does not always lend itself to making the hinged joint 21 between the body 1 of the case 20 and its lid 2. Forming the hinges themselves would make the case exorbitantly expensive. This is why, according to another advantageous embodiment of the invention, the joint between body 1 and lid 2 of the case 20 is provided by a simple band 19 straddling the body 1 and the lid 2, and made of an appropriate material able to withstand repeated folding. This band 19 is applied either by cementing with a suitable adhesive or by high-frequency electric welding.

It appears clearly from the description hereinabove that the protection provided for the record inside the case in question is perfect, whether the cases are stacked or on end. In the first case, the combined action of first and second joints 3 and 4, center pin 10 and supports 13, 14, 15 and 16 prevents the case from being crushed in any way. In the second case, the record never rests upon its edge. It is, in fact, suspended on center pin 10 when case 20 is not lying flat.

Moreover, the labyrinth composed of two successive joints 3 and 4, effectively prevents dust and moisture from reaching the record.

It is always easy to open the case due to the presence of tabs 16 and 17 and venting hole 12.

Of course many detailed modifications could be made to the various elements comprising the phonograph record case, a preferred embodiment thereof is represented here, without thereby departing from the framework of the invention. For example, in at least one of the angular zones of lid 2 between joint elements 7 and 8 an inflated part could be provided, formed in one piece with the lid, acting as an additional stiffener and able to constitute a pocket containing, for example, a record-cleaning cloth.

Finally, although the present specification relates especially to a phonograph record case, the invention also applies to construction of cases intended for packing and displaying other objects with the same main features as record cases (except, in certain cases, elimination of the center pin). Among such objects one may cite, for example, magnetic recording tape reels and movie film reels; articles of clothing such as neckties, shirts, scarves, and hose; miscellaneous objects such as eyeglasses, etc.

In these types of applications the case is also composed of a body and a lid engaging one another by a set of flush joints, the male elements of which are located on the case body and the female elements on the lid; the first joint is formed on all or part of the periphery of the case while the second is formed on the surface of the case and its shape can be adapted to the object to be enclosed, for example, circular (in the case of recording tape or film reels) or elliptical (in the case of neckties).

What is claimed is:

1. In an individual case for discrete miscellaneous articles composed of a thin molded synthetic material, the case having a substantially rectangular body, and a substantially rectangular lid hingedly jointed to said rectangular body, wherein the improvement comprises:
    first and second flush joints formed by cooperating elements in the body and the lid, each flush joint consisting of a male member and a female member, wherein said first joint is formed on the four rectilinear edges of the case and said second joint is formed in a shape encircling the outer periphery of the miscellaneous article,
    whereby said first and second flush joints allow for tight closure between the case body and the case lid and simultaneously stiffens the edges of the case body and the case lid to provide a very rigid case for better protection of the miscellaneous article.

2. In an individual case for phonograph records composed of a thin molded synthetic material and having an aperture in the center thereof and an annular recessed portion to receive the grooved portion of the record, the case having a substantially rectangular body, and a substantially rectangular lid hingedly jointed to said rectangular body at one edge, wherein the improvement comprises:
    first and second flush joints formed by cooperating elements in the body and the lid, each flush joint consisting of a male member and a female member, wherein said first joint is formed on the four rectilinear edges of the case and said second joint is circular and encircles the outer periphery of the record, with said male member of said second joint determining the position of the space occupied by the record and also pre-centering the record in the body of the case;
    whereby said first and second flush joints allow for a tight closure between the case body and the case lid and simultaneously stiffens the edges of the case body and the case lid to provide a very rigid case for better protection of the record.

3. A case according to claim 2, wherein a portion of said body of the case forms said male elements of said first and second joints, and said female elements of said first and second flush joints are formed by a portion of said lid.

4. A case according to claim 2, wherein said record has a spindle hole and said centering pin for the record passes through said spindle hole in the record and extends up to the lid to keep the record in place, and once the case has been closed, the centering pin abuts said case lid, thus preventing, in cooperation with said two flush joints, the record from being crushed.

5. A case according to claim 4, wherein said centering pin is conical to exercise a slight wedging effect against the inner edge of said spindle hole in the record.

6. A case in accordance with claim 5, wherein said male element of said first joint is interrupted at the four corners of said case body, to facilitate opening and closure thereof, while said female element of said first joint is continuous on the lid periphery thereby insuring rigidity of said first joint.

7. A case according to claim 2, wherein said male element of said second joint contains a notch to facilitate lifting the record from its space.

8. A case according to claim 2, wherein a portion of said body and of said lid each form two plane circular bearing zones for support of the record, corresponding respectively to the record center label and the record ungrooved periphery, another portion of said body and of said lid form an annular recess corresponding to the grooved part of the record such that the grooves stand free of said body and said lid of the case, said recess also contributing by the circular edges thereof to stiffening said body and said lid of the case.

9. A case according to claim 2, wherein tabs facilitating opening of the case are formed respectively on one edge of said lid and of said body, said tabs also being usable as filing markers.

10. A case according to claim 2, wherein the case is made wholly of plastic, the lid, and if desired, the body being printed or embossed to show any desirable inscription.

11. A case according to claim 2 further including at least one stiffener member between said female members of said first and second joints.

12. A case according to claim 2 further including at least one stiffener member between said male members of said first and second flush joints.

* * * * *